(12) United States Patent
Karlak et al.

(10) Patent No.: US 10,164,431 B2
(45) Date of Patent: Dec. 25, 2018

(54) OUTAGE MANAGEMENT AND PREDICTION FOR A POWER GRID SYSTEM

(71) Applicant: General Electric Technology GmbH, Baden (CH)

(72) Inventors: Alan Karlak, Redmond, WA (US); Villy Vassdal, Redmond, WA (US); Bret Phillips, Bellevue, WA (US); Brajesh Kumar, Kirkland, WA (US)

(73) Assignee: General Electric Technology GmbH, Baden (CH)

( * ) Notice: Subject to any disclaimer, the term of this patent is extended or adjusted under 35 U.S.C. 154(b) by 261 days.

(21) Appl. No.: 15/071,402

(22) Filed: Mar. 16, 2016

(65) Prior Publication Data

US 2016/0276831 A1 Sep. 22, 2016

Related U.S. Application Data

(60) Provisional application No. 62/134,543, filed on Mar. 17, 2015.

(51) Int. Cl.
*G06F 3/12* (2006.01)
*H02J 3/00* (2006.01)
(Continued)

(52) U.S. Cl.
CPC .............. *H02J 3/00* (2013.01); *G05B 13/026* (2013.01); *G06Q 10/0631* (2013.01); *G06Q 50/06* (2013.01)

(58) Field of Classification Search
CPC ....................................................... G06Q 50/06
(Continued)

(56) References Cited

U.S. PATENT DOCUMENTS

| 5,568,399 A * | 10/1996 | Sumic | G01R 31/086 |
| | | | 700/293 |
| 6,259,972 B1 * | 7/2001 | Sumic | H02H 1/0092 |
| | | | 700/286 |

(Continued)

OTHER PUBLICATIONS

European Office Action dated Nov. 21, 2016 for European Application Serial No. 16168707.4, 2 pages.
(Continued)

*Primary Examiner* — Suresh Suryawanshi
(74) *Attorney, Agent, or Firm* — Amin, Turocy & Watson, LLP

(57) ABSTRACT

Outages associated with an electrical energy distribution system are managed, identified and/or predicted. In an implementation, a system provides for generating network topology data, indicative of a topology for an electrical energy distribution system associated with a power outage, based on connectivity data for devices in the electrical energy distribution system. The system also provides for determining, based on the network topology data, a first set of devices from the devices that are de-energized and determining a second set of devices from the devices that are not included in the first set of devices. Furthermore, the system provides for updating, based on report data associated with the second set of devices, the network topology data. Then, the system provides for identifying, based on the updated network topology data, a device from the second set of devices that satisfies a criterion associated with the power outage.

20 Claims, 13 Drawing Sheets

(51) Int. Cl.
*G05B 13/02* (2006.01)
*G06Q 10/06* (2012.01)
*G06Q 50/06* (2012.01)

(58) Field of Classification Search
USPC .......................................................... 700/286
See application file for complete search history.

(56) References Cited

U.S. PATENT DOCUMENTS

| | | | | |
|---|---|---|---|---|
| 6,687,574 | B2 * | 2/2004 | Pietrowicz | H02J 13/0024 |
| | | | | 700/292 |
| 7,551,984 | B1 * | 6/2009 | Fickey | G06Q 10/06 |
| | | | | 700/286 |
| 7,853,417 | B2 * | 12/2010 | Vaswani | G01D 4/004 |
| | | | | 702/182 |
| 7,965,195 | B2 * | 6/2011 | Deaver, Sr. | G08B 25/06 |
| | | | | 340/3.44 |
| 8,000,913 | B2 * | 8/2011 | Kreiss | H02J 3/14 |
| | | | | 324/512 |
| 8,930,455 | B2 * | 1/2015 | Kan | H02J 13/0017 |
| | | | | 702/58 |
| 9,658,081 | B2 * | 5/2017 | Vaswani | G01D 4/004 |
| 2009/0187284 | A1 * | 7/2009 | Kreiss | G06Q 50/06 |
| | | | | 700/291 |
| 2009/0289637 | A1 * | 11/2009 | Radtke | G01R 27/16 |
| | | | | 324/629 |
| 2010/0152910 | A1 * | 6/2010 | Taft | G01D 4/002 |
| | | | | 700/286 |
| 2012/0203388 | A1 | 8/2012 | Diluciano et al. | |
| 2012/0296607 | A1 | 11/2012 | Jain et al. | |
| 2015/0261241 | A1 * | 9/2015 | McKeag | G05B 15/02 |
| | | | | 700/295 |

OTHER PUBLICATIONS

Extended European Search Report dated Jun. 29, 2016 for European Application Application Serial No. 16160898.9, 10 pages.

* cited by examiner

OUTAGE MANAGEMENT AND PREDICTION FOR A POWER GRID SYSTEM

RELATED APPLICATION

This application claims priority to U.S. Provisional Application No. 62/134,543, filed Mar. 17, 2015, and entitled "Outage Management System Prediction Engine", the entirety of which is incorporated herein by reference.

TECHNICAL FIELD

The disclosed subject matter relates to managing outages associated with a power grid system.

BACKGROUND

A power grid is a complex and dynamic system that is difficult to manage. Furthermore, a power grid is often integrated with other power grids, resulting in a large-scale power grid system. In a conventional power grid system, a location of a power outage in the power grid system is identified by operators and/or other power grid personnel as part of a troubleshooting operation. For example, a conventional outage management system determines a location of a power outage by employing phone calls received from customers and/or by applying a set of heuristic rules (e.g., if two customers attached to a transformer are determined to be out, then it is determined that the transformer is also out). However, employing phone calls received from customers to identify a location of a power outage is inefficient and reduces performance of the power grid system. Furthermore, employing a set of heuristic rules to identify a power outage is not reliable since the set of heuristic rules generally only works with a single distribution configuration for a power grid system. Moreover, identifying a location of a power outage using conventional techniques is difficult and/or complex.

The above-described background relating to power grid systems is merely intended to provide a contextual overview of some current issues, and is not intended to be exhaustive. Other contextual information may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an example implementation, a system provides for generating network topology data, indicative of a topology for an electrical energy distribution system associated with a power outage, based on connectivity data indicative of a connectivity status for devices in the electrical energy distribution system. The system also provides for determining, based on the network topology data, a first set of devices from the devices that are de-energized and determining a second set of devices from the devices that are not included in the first set of devices. Furthermore, the system provides for updating, based on report data indicative of report information provided by user identities associated with the second set of devices, the network topology data to generate updated network topology data. Then, the system provides for identifying, based on the updated network topology data, a device from the second set of devices in the electrical energy distribution system that satisfies a criterion associated with the power outage.

In accordance with another example implementation, a method provides for generating, by a system comprising a processor, topology data, indicative of an arrangement and a power status of devices in an electrical energy distribution system, based on connectivity data indicative of a connectivity status for the devices. The method also provides for determining, by the system, a set of de-energized devices from the devices based on the network topology data and determining, by the system, a set of candidate devices from the devices that are not included in the set of de-energized devices. Furthermore, the method provides for updating, by the system, the topology data to generate updated topology data based on report data indicative of report information provided by user identities associated with the set of candidate devices. The method then provides for selecting, by the system and based on the updated topology data, a device from the set of candidate devices that satisfies a criterion associated with a power outage in the electrical energy distribution system.

In accordance with yet another example implementation, a computer readable storage device comprises executable instructions that, in response to execution, cause a device comprising a processor to perform operations, comprising: generating network topology data, indicative of a topology calculation for a power grid system associated with a power outage, based on switching data indicative of a status for switching operations associated with devices in the power grid system. The operations also comprise determining, based on the network topology data, a first group of devices from the devices that are de-energized and determining a second group of devices from the devices that are not included in the first group of devices. Furthermore, the operations comprise updating, based on call data indicative of phone call feedback provided by user identities associated with the second group of devices, the network topology data to generate updated network topology data. The operations also comprise identifying, based on the updated network topology data, a device from the second group of devices in the electrical energy distribution system that is a source for the power outage.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
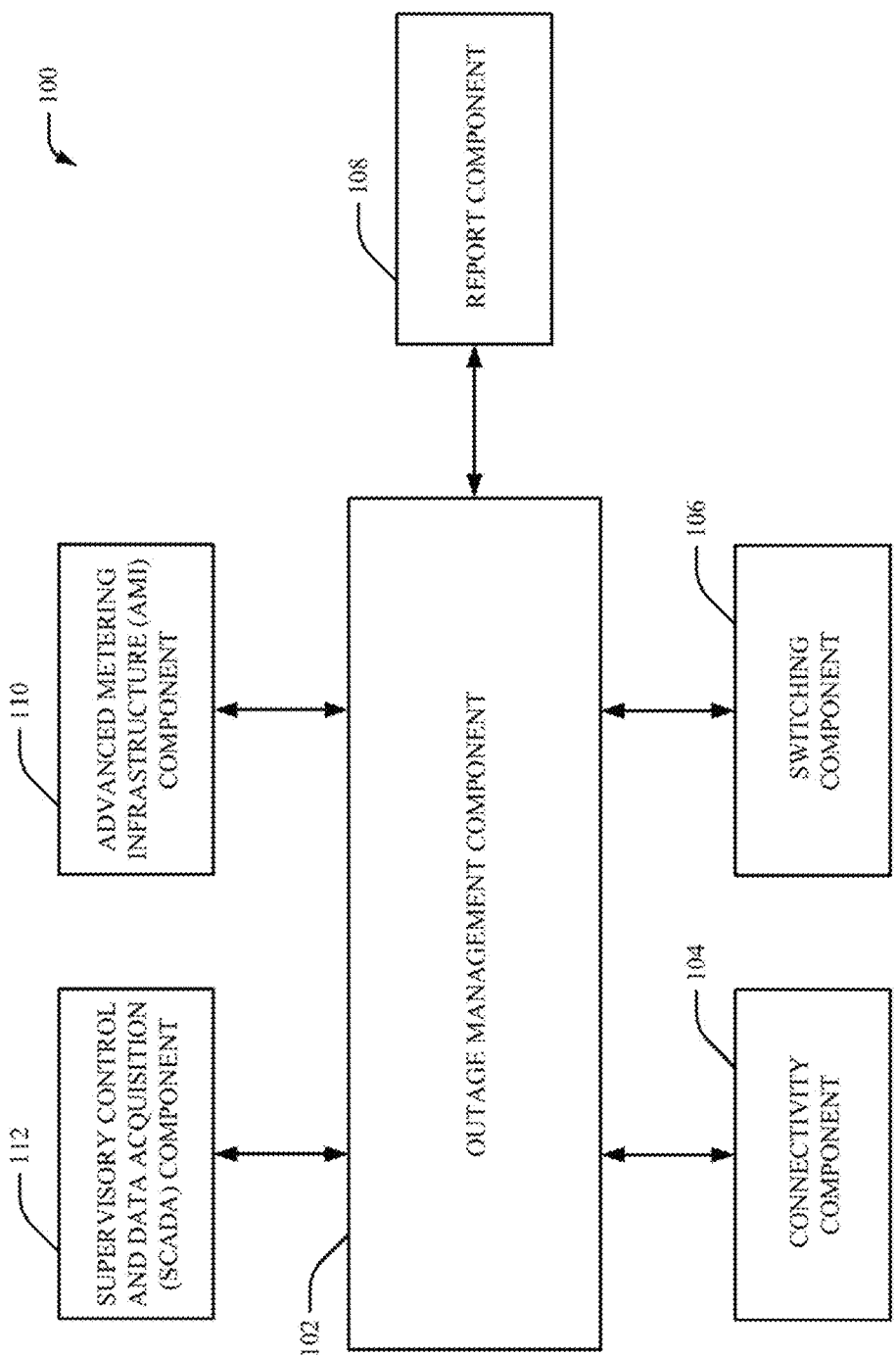
FIG. 1 illustrates an outage management system in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As used in this application, the terms "component," "system," "platform," "interface," "node", "source", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

In a conventional power grid system, a location of a power outage in the power grid system is identified by operators and/or other power grid personnel as part of a troubleshooting operation. For example, a conventional outage management system determines a location of a power outage by employing phone calls received from customers and/or by applying a set of heuristic rules (e.g., if two customers attached to a transformer are determined to be out, then it is determined that the transformer is also out). However, employing phone calls received from customers to identify a location of a power outage is inefficient and reduces performance of the power grid system. Furthermore, employing a set of heuristic rules to identify a power outage is not reliable since the set of heuristic rules generally only works with a single distribution configuration for a power grid system. Moreover, identifying a location of a power outage using conventional techniques is difficult and/or complex.

To these and/or related ends, techniques for managing, predicting and/or identifying a source for an outage (e.g., a power outage) associated with an electrical energy distribution system (e.g., a power grid system, etc.) are presented. For example, knowledge of a network topology for the electrical energy distribution system, information regarding network topology changes in the electrical energy distribution system, meter data (e.g., meter readings) associated with the electrical energy distribution system, phone call data associated with the electrical energy distribution system and/or other information associated with the electrical energy distribution system can be employed to predict a device (e.g., equipment) in the electrical energy distribution system that caused a power outage in the electrical energy distribution system.

In an aspect, an outage management system can be integrated with real-time systems and/or can be provided with real-time data to facilitate identification of a device (e.g., equipment) in the electrical energy distribution system that caused a power outage in the electrical energy distribution system. In another aspect, an outage management system can be integrated with a control center (e.g., data and/or inter-processes associated with a control center), a communications system, a voice system, an emergency system, a call center system and/or another real-time system to manage, predict and/or identify outages in the electrical energy distribution system. In yet another aspect, a device that is causing a power outage in the electrical energy distribution system can be identified based on observations associated with the electrical energy distribution system. The observations can include, but are not limited to, outage reports from customers (e.g., feedback data from phone calls and/or outage phone calls), automated meter infrastructure outage reports, supervisory control and data acquisition reports associated with a state of devices in the electrical energy distribution system, switching operations associated with the electrical energy distribution system, a status of switching devices included in the electrical energy distribution system, telemeter data associated with the electrical energy distribution system, manually input data associated with the electrical energy distribution system, reports of power-on or power-off changes in the electrical energy distribution system, automatic meter infrastructure "ping" responses, etc. By employing the observations associated with the electrical energy distribution system, an "as-switched" network status and/or a current network state of the electrical energy distribution system can be determined. As such, an operator can more accurately dispatch a field crew to repair the device that caused the power outage, to repair other devices associated with the power outage and/or to restore power to customers in a shorter period of time. Moreover, difficulty and/or complexity of identifying a location of a power outage in the electrical energy distribution system can be reduced, and accuracy of identifying the device that caused a power outage the electrical energy distribution system can be improved.

FIG. 1 is an illustration of a system 100, which facilitates managing and/or identifying a source for an outage (e.g., a power outage) associated with an electrical energy distribution system (e.g., a power grid system, etc.) in accordance with aspects of the subject disclosure. System 100 includes an outage management component 102. Additionally, the system 100 can include a connectivity component 104, a switching component 106, a report component 108, an advanced metering infrastructure (AMI) component 110 and/or a supervisory control and data acquisition (SCADA) component 112. The outage management component 102 can manage, identify and/or predict a source (e.g., a source device, source equipment) for an outage (e.g., a power outage) associated with an electrical energy distribution system (e.g., a power grid system). An outage (e.g., a power outage) can be a condition associated with the electrical energy distribution system where at least one device in the electrical energy distribution system does not receive power (e.g., where at least one device in the electrical energy distribution system is de-energized). The outage management component 102 can be coupled to and/or integrated with the connectivity component 104, the switching component 106, the report component 108, the AMI component 110 and/or the SCADA component 112. Furthermore, the outage management component 102 can receive information generated and/or provided by the connectivity component 104, the switching component 106, the report component 108, the AMI component 110 and/or the SCADA component 112, which can be employed by the outage management component 102 to manage, identify and/or predict the source for the outage (e.g., the power outage) associated with the electrical energy distribution system (e.g., the power grid system).

The outage management component 102 can be implemented as, and/or associated with, an outage management system. In certain implementations, the outage management component 102 can be integrated with a control center system that manages power transmission and/or power distribution associated with the electrical energy distribution system. For example, the control center system can measure, analyze and/or control power transmission and/or power distribution associated with the electrical energy distribution system. The control center system can additionally or alternatively manage other real-time operations associated with the electrical energy distribution system. Furthermore, the outage management component 102 can operate using a distribution network model, a model of utility customers where customers are connected with respect to the electrical energy distribution system, and/or a set of observations associated with electrical energy distribution system.

The connectivity component 104 can determine and/or manage connectivity statuses of devices in the electrical energy distribution system. For example, the connectivity component 104 can determine which devices in the electrical energy distribution system are connected to other devices in the electrical energy distribution system (e.g., where devices in the electrical energy distribution system are connected, etc.). Additionally or alternatively, the connectivity component 104 can determine which devices in the electrical energy distribution system are connected to a power source (e.g., a transformer, an electrical substation, etc.), a transmission line and/or a grid (e.g., a transmission grid, a distribution grid, etc.) that provides power. For example, the connectivity component 104 can determine a connectivity state for devices in the electrical energy distribution system and/or which devices in the electrical energy distribution system are associated with a powered grid connection.

The switching component 106 can determine and/or manage statuses for switching operations associated with the devices in the electrical energy distribution system. A switching operation can be an operation to interrupt, de-energize and/or disconnect a portion of the electrical energy distribution system (e.g., one or more devices in the electrical energy distribution system). For example, a switching operation can be an operation to open one or more switches associated with a device in the electrical energy distribution system (e.g., the switching operation can be an operation to disconnect one or more transmission lines associated with a device in the electrical energy distribution system). In an aspect, a switching operation can be performed in response to an outage request to interrupt power (e.g., a power supply) provided to a device (e.g., equipment) in the electrical energy distribution system. The outage request can be associated with scheduling information indicative of a schedule for performing the switching operation. It is to be appreciated that a switching operation can alternatively be an operation to energize and/or connect a portion of (e.g., one or more devices in) the electrical energy distribution system. For example, a switching operation can be an operation to close one or more switches associated with a device in the electrical energy distribution system (e.g., the switching operation can be an operation to connect one or more transmission lines associated with a device in the electrical energy distribution system).

Information provided by the connectivity component 104 and/or the switching component 106 can be employed by the outage management component 102 to construct a network topology of the electrical energy distribution system. For example, connectivity statuses for the devices in the electrical energy distribution system and/or statuses for switching operations associated with the devices in the electrical energy distribution system can be employed by the outage management component 102 to construct the network topology of the electrical energy distribution system. The network topology can be indicative of an arrangement and/or a power status of devices in the electrical energy distribution system.

The report component 108 can provide reports to the outage management component 102. The reports can be associated with devices and/or particular locations associated with the electrical energy distribution system. In an aspect, the report component 108 can generate the reports based on phone calls and/or voice logs received from user identities (e.g., customers) in the electrical energy distribution system. For example, a customer (e.g., a customer with a device linked to a transformer) can call a control center associated with the report component 108 to report a power outage in the electrical energy distribution system. Furthermore, information provided to the control center by the customer can be employed to generate the reports. In one example, the reports can be generated based on interactive voice response data provided by customers during phone calls to the control center. The report component 108 can also generate the reports based on weather events and/or other information associated with external systems and/or regional transmission organizations. Additionally, the report component 108 can determine a list of alarms related to an interruption in the electrical energy distribution system. The report component 108 can process the list of alarms and/or filter the list of alarms to facilitate generation of the reports. In one example, the report component 108 can determine a subset of alarms from the list of alarms that are related to a specific power outage in the electrical energy distribution system.

The AMI component 110 can be associated with a set of meters (e.g., smart meters, meter equipment, etc.) and/or communication networks associated with the electrical energy distribution system. The set of meters associated with the electrical energy distribution system can provide information to the outage management component 102 via communication network(s) between the set of meters and the outage management component 102. For example, each meter from the set of meters can determine consumption of power (e.g., electric energy) during a certain period of time (e.g., during an hour interval, during a 30 minute interval, etc.). Furthermore, the consumption of power determined by each meter from the set of meters can be provided (e.g., transmitted) to the outage management component 102. Moreover, the outage management component 102 can provide (e.g., transmit) information to each meter from the set of meters. In an aspect, the set of meters (e.g., the AMI component 110 in communication with the set of meters) can provide automatic meter readings to the outage management component 102. In another aspect, the AMI component 110 can analyze power flows in the electrical energy distribution system.

The SCADA component 112 can be associated with a system for monitoring and/or controlling devices in the electrical energy distribution system. For example, the SCADA component 112 can provide real-time information (e.g., real-time information associated with the devices in the electrical energy distribution system) and/or sensor information (e.g., sensor information associated with the devices in the electrical energy distribution system) to the outage management component 102. In an aspect, the SCADA component 112 can control automated processing of alarms in the electrical energy distribution system, obtain and/or analyze measurement data (e.g., associated with a synchrophasor and/or another measuring device) in the electrical energy distribution system, monitor relay data associated with the electrical energy distribution system, monitor oscillation data associated with the electrical energy distribution system, manage limits (e.g., set point limits) associated with the electrical energy distribution system, manage alarms and/or overloads associated with the electrical energy distribution system, manage tagging data for equipment associated with the electrical energy distribution system, manage archiving of data associated with the electrical energy distribution system, manage faults associated with the electrical energy distribution system (e.g., via a fault location isolation and service restoration (FLISR) system), monitor and/or study the electrical energy distribution system, and/or manage other data associated with the electrical energy distribution system. In another aspect, the SCADA component 112 can be associated with remote terminal units connected to sensors in the electrical energy distribution system, programmable logic controllers connected to sensors in the electrical energy distribution system and/or a communication system (e.g., a telemetry system) associated with the electrical energy distribution system. In yet another aspect, the AMI component 110 and/or the SCADA component 112 can be real-time systems for providing real-time data (e.g., real-time data associated with devices, meters, sensors and/or other equipment in the electrical energy distribution system) to the outage management component 102. For example, the AMI component 110 and/or the SCADA component 112 can provide real-time measurement data, real-time operational data and/or real-time feedback data to the outage management component 102.

In an embodiment, the outage management component 102 can generate network topology data that is indicative of a topology (e.g., a topology calculation) for the electrical energy distribution system (e.g., in response to a determination that the electrical energy distribution system is associated with a power outage). The outage management component 102 can generate the network topology data for the electrical energy distribution system based on connectivity information provided by the connectivity component 104. Additionally or alternatively, the outage management component 102 can generate the network topology data for the electrical energy distribution system based on switching information provided by the switching component 106. Based on the network topology data, the outage management component 102 can then determine a first set of devices (e.g., a first group of devices, a first subset of devices, etc.) from devices included in the electrical energy distribution system. The first set of devices determined by the outage management component 102 can be de-energized (e.g., the first set of devices can be a set of de-energized devices). Furthermore, the outage management component 102 can determine a second set of devices (e.g., a second group of devices, a second subset of devices, etc.) from the devices included in the electrical energy distribution system. The second set of devices can be a set of devices that are not included in the first set of devices. Moreover, the second set of devices can be a set of devices that are not confirmed by the outage management component 102 to be de-energized (e.g., a device included in the second set of devices may be de-energized or energized). The outage management component 102 can also update the network topology data (e.g., to generate updated network topology data) based on report information provided by the report component 108. The report information provided by the report component 108 can be information provided by user identities associated with the second set of devices. Then, the outage management component 102 can identify a device from the second set of devices in the electrical energy distribution system that satisfies a criterion associated with a power outage. For example, the outage management component 102 can identify a device from the second set of devices based on the updated network topology data. The device identified by the outage management component 102 can be a source for an outage (e.g., a power outage) associated with the electrical energy distribution system. Accordingly, difficulty and/or complexity of identifying a location of a power outage in the electrical energy distribution system can be reduced. Moreover, accuracy of identifying the device that caused a power outage in the electrical energy distribution system can be improved.

Figure 2:
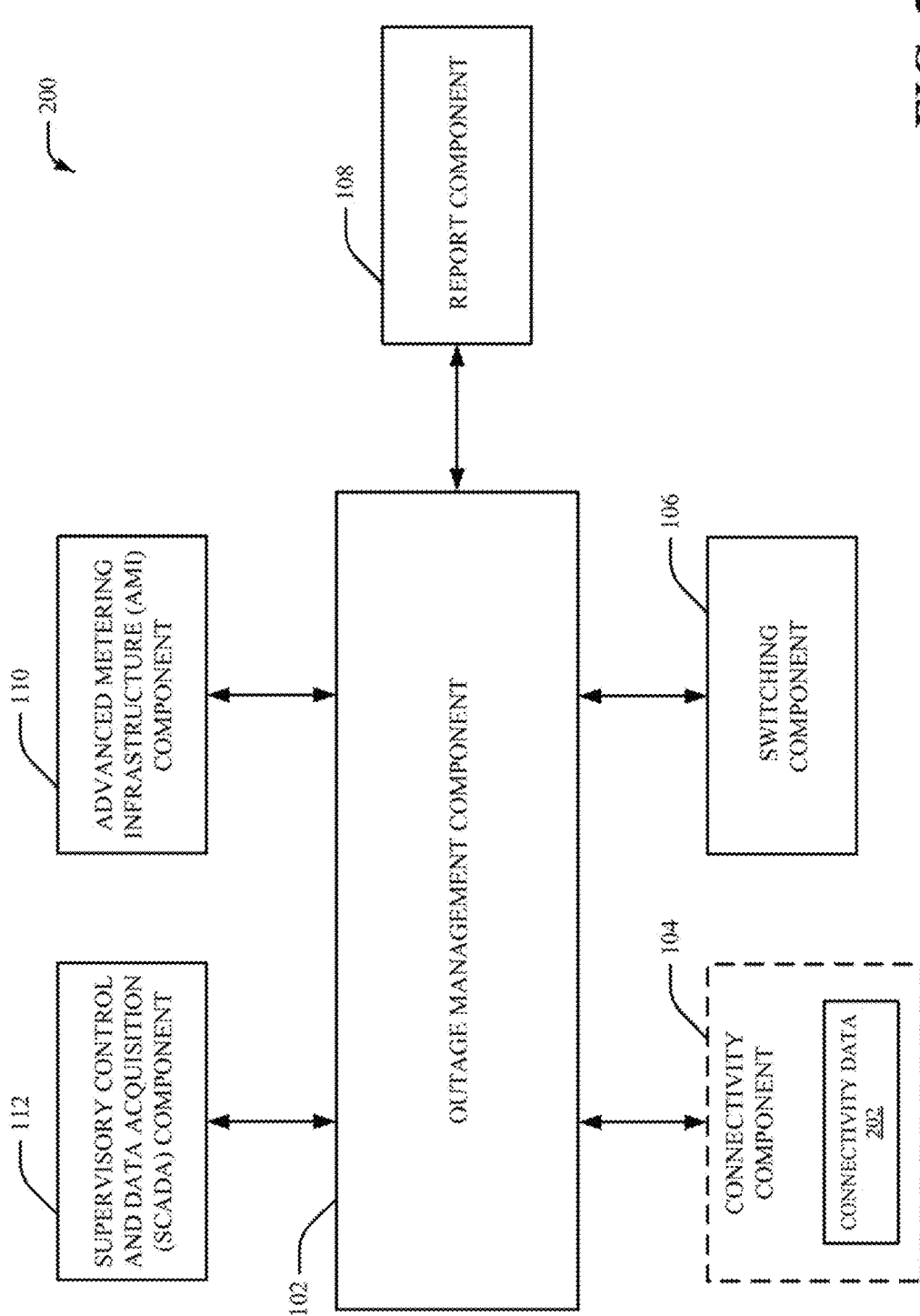
FIGS. 2-7 also illustrate the outage management system in accordance with other aspects of the subject disclosure.

FIG. 2 is a diagram of an example system 200 in accordance with aspects of the subject disclosure. System 200 includes the outage management component 102. Additionally, the system 200 can include the connectivity component 104, the switching component 106, a report component 108, the AMI component 110 and/or the SCADA component 112. The connectivity component 104 can generate connectivity data 202. Furthermore, the connectivity component 104 can provide (e.g., transmit) the connectivity data 202 to the outage management component 102. The connectivity data 202 can be data indicative of a connectivity status for devices in the electrical energy distribution system. For example, the connectivity data 202 can provide data as to where and/or how devices are connected (e.g., to other devices, via particular transmission lines, etc.) within the electrical energy distribution system. The connectivity data 202 can also provide connectivity states of the devices in the electrical energy distribution system (e.g., based on connection points, based on busses, etc.). For example, the connectivity data 202 can identify whether power is being transmitted via connections between devices in the electrical energy distribution system. In a non-limiting example, the connectivity component 104 can determine that a first device from the devices associated with the electrical energy distribution system is connected to a second device from the devices associated with the electrical energy distribution system (e.g., via a transmission line, etc.). Additionally, the connectivity component 104 can determine whether or not electrical energy is provided between the first device from the devices and the second device from the devices (e.g., via a transmission line, etc.). In an aspect, the outage management component 102 can employ the connectivity data 202 to construct a network topology of the electrical energy distribution system (e.g., an arrangement and/or power status of devices in the electrical energy distribution system).

Figure 3:
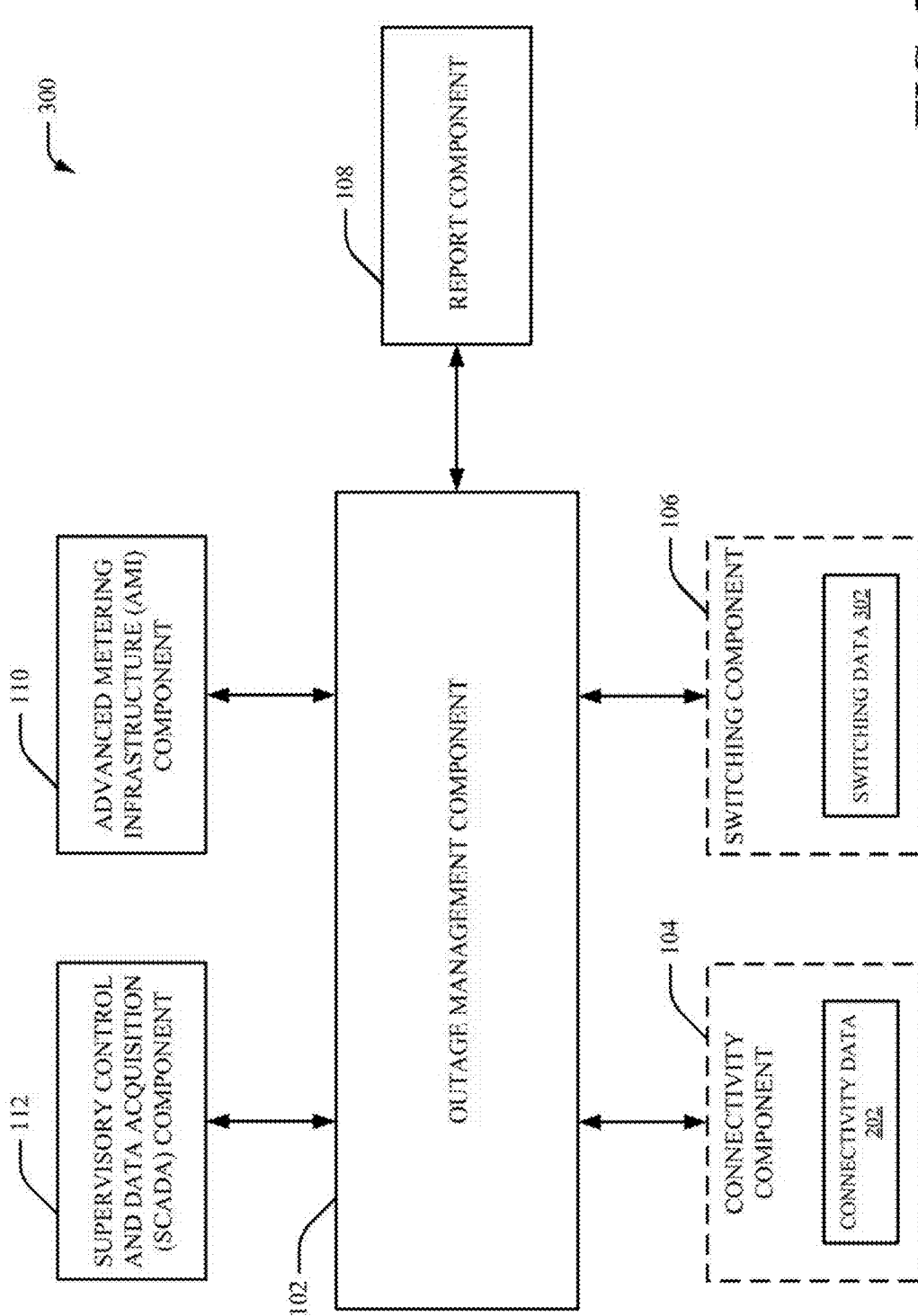

FIG. 3 is a diagram of an example system 300 in accordance with aspects of the subject disclosure. System 300 includes the outage management component 102. Additionally, the system 300 can include the connectivity component 104, the switching component 106, a report component 108, the AMI component 110 and/or the SCADA component 112. The switching component 106 can generate switching data 302. Furthermore, the switching component 106 can provide (e.g., transmit) the switching data 302 to the outage management component 102. The switching data 302 can be data indicative of a status for switching operations associated with the devices in the electrical energy distribution system. For example, a switching operation can be an operation that disconnects one or more transmission lines associated with device(s) in the electrical energy distribution system. Alternatively, a switching operation can be an operation that connects one or more transmission lines associated with device(s) in the electrical energy distribution system.

The switching data 302 can be associated with (e.g., generated in response to) switching operations (e.g., switching operations associated with the devices in the electrical energy distribution system) managed by the switching component 106. Furthermore, the switching data 302 can be generated based on power application information, power generation information, power transmission information, power distribution information, power grid knowledge information, substation information, maintenance information and/or other information associated with the electrical energy distribution system. Additionally, the switching data 302 can be associated with switching orders (e.g., switching orders associated with the electrical energy distribution system) generated and/or managed by the switching component 106. For example, the switching component 106 can manage (and the switching data 302 can be associated with) a process required to plan, define, organize, verify, communicate and/or execute switching steps required to de-energize and/or isolate a portion of the electrical energy distribution system. The switching component 106 can manage (and the switching data 302 can be associated with) equipment affected by a switching operation associated with the electrical energy distribution system. For example, the switching component 106 can manage (and the switching data 302 can be associated with) equipment such as, but not limited to, transmission lines, transformers and/or other equipment that may become overloaded due to redistribution of power flow during a switching operation. Additionally, the switching component 106 can manage (and the switching data 302 can be associated with) secondary equipment in the electrical energy distribution system that is associated with a switching operation. In one example, the switching component 106 can manage (and the switching data 302 can be associated with) equipment that is not directly related to a switching operation in the electrical energy distribution system, but is required to ensure safety when performing field operations. In an aspect, the outage management component 102 can employ the switching data 302 to construct a network topology of the electrical energy distribution system (e.g., an arrangement and/or power status of devices in the electrical energy distribution system).

In an aspect, the switching data 302 can be associated with a set of steps to de-energize a portion of the electrical energy distribution system (e.g., the portion of the electrical energy distribution system associated with the device). For example, the switching component 106 can determine a set of actions associated with the electrical energy distribution system based on a request to de-energize the portion of the electrical energy distribution system. Additionally, the switching data 302 can be associated with safety clearance information related to the set of steps to de-energize the portion of the electrical energy distribution system. In another aspect, the switching data 302 can be associated with a notification related to a status of the electrical energy distribution system and/or devices in the electrical energy distribution system in response to the switching operation. In yet another aspect, the switching data 302 can be associated with authorizations (e.g., permits) related to a set of steps (e.g., a set of actions) to de-energize or energize a portion of the electrical energy distribution system. For example, the switching component 106 can generate (e.g., issue) one or more authorizations related to a set of steps (e.g., a set of actions) to de-energize the portion of the electrical energy distribution system.

Figure 4:
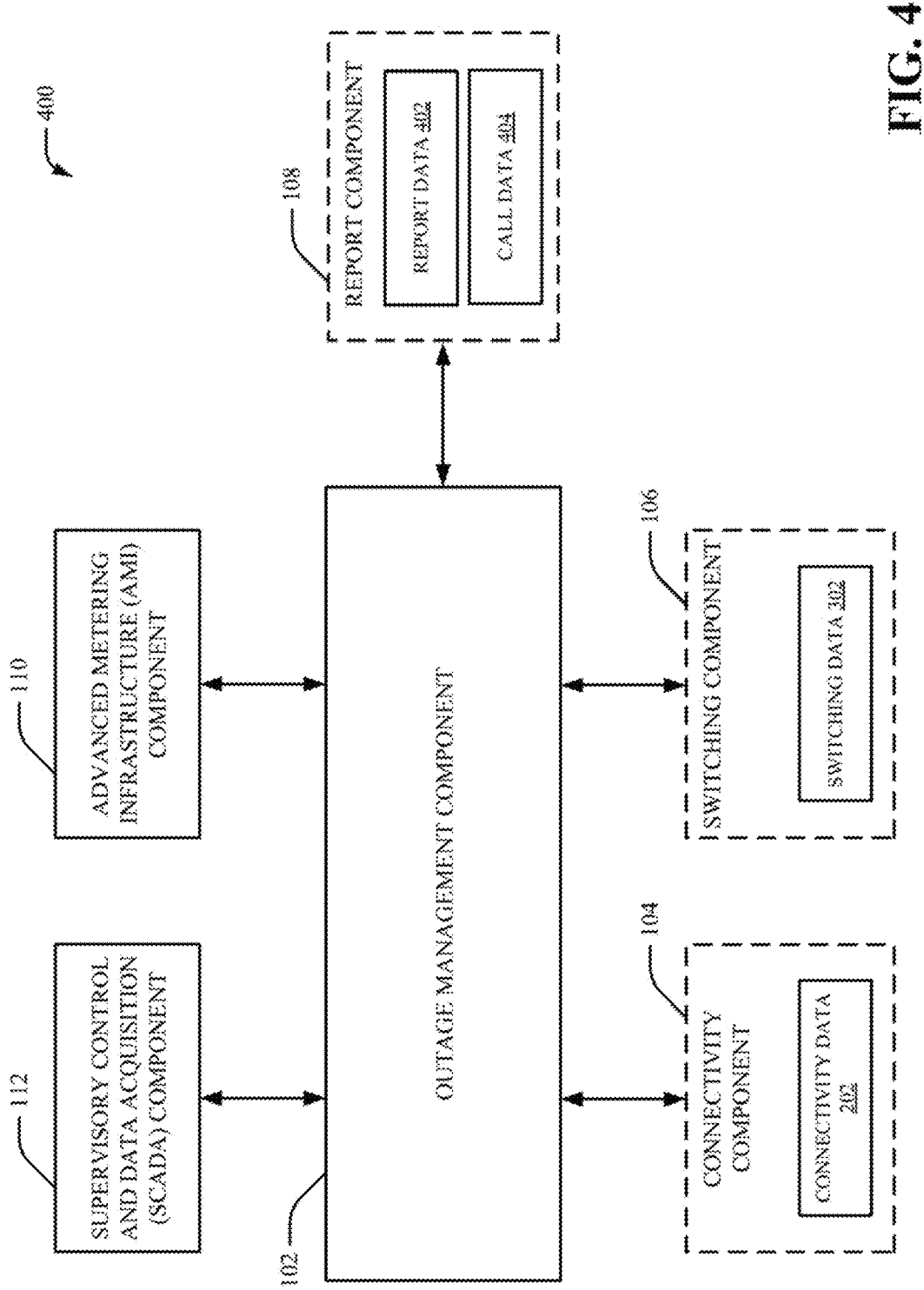

FIG. 4 is a diagram of an example system 400 in accordance with aspects of the subject disclosure. System 400 includes the outage management component 102. Additionally, the system 400 can include the connectivity component 104, the switching component 106, a report component 108, the AMI component 110 and/or the SCADA component 112. The report component 108 can generate report data 402. Furthermore, the report component 108 can provide (e.g., transmit) the report data 402 to the outage management component 102. In an aspect, the report data 402 can be generated based on call data 404. For example, the report data can be data indicative of report information generated based on call data 404 provided by user identities associated with devices in the electrical energy distribution system. The call data 404 can also be generated based on emergency center information and/or call center information received from customers over the phone. In an aspect, the call data 404 can be phone call feedback, voice information and/or communications information generated based on feedback provided by customers regarding a status of the power outage in the electrical energy distribution system. Furthermore, the call data 404 can be generated based on a notification (e.g., a phone call, etc.) provided by customers regarding a status of the power outage in the electrical energy distribution system.

The report data 402 can also be associated with a log (e.g., an event record) generated by the report component 108. For example, the report data 402 can be a starting point for collecting information associated with an interruption in the electrical energy distribution system. Additionally, the report data 402 can be associated with a set of actions to be performed to recover from the interruption. For example, the report data 402 can be an event log employed to identify an original cause of an interruption in the electrical energy distribution system and/or to identify references to a set of alarms that originally detected the interruption. In one example, the report data 402 and/or the call data 404 can be generated in response to a notification (e.g., a phone call, etc.) and/or can be employed to update status of equipment in a non-monitored portion of the electrical energy distribution system. The report data 402 and/or the call data 404 can be can be associated with information, such as but not limited to, a location in the electrical energy distribution system, a reason for a power outage in the electrical energy distribution system, a start time associated with a power outage in the electrical energy distribution system, an EMS state associated with a power outage in the electrical energy distribution system, customer impact analysis, interruption reporting, etc.

Figure 5:
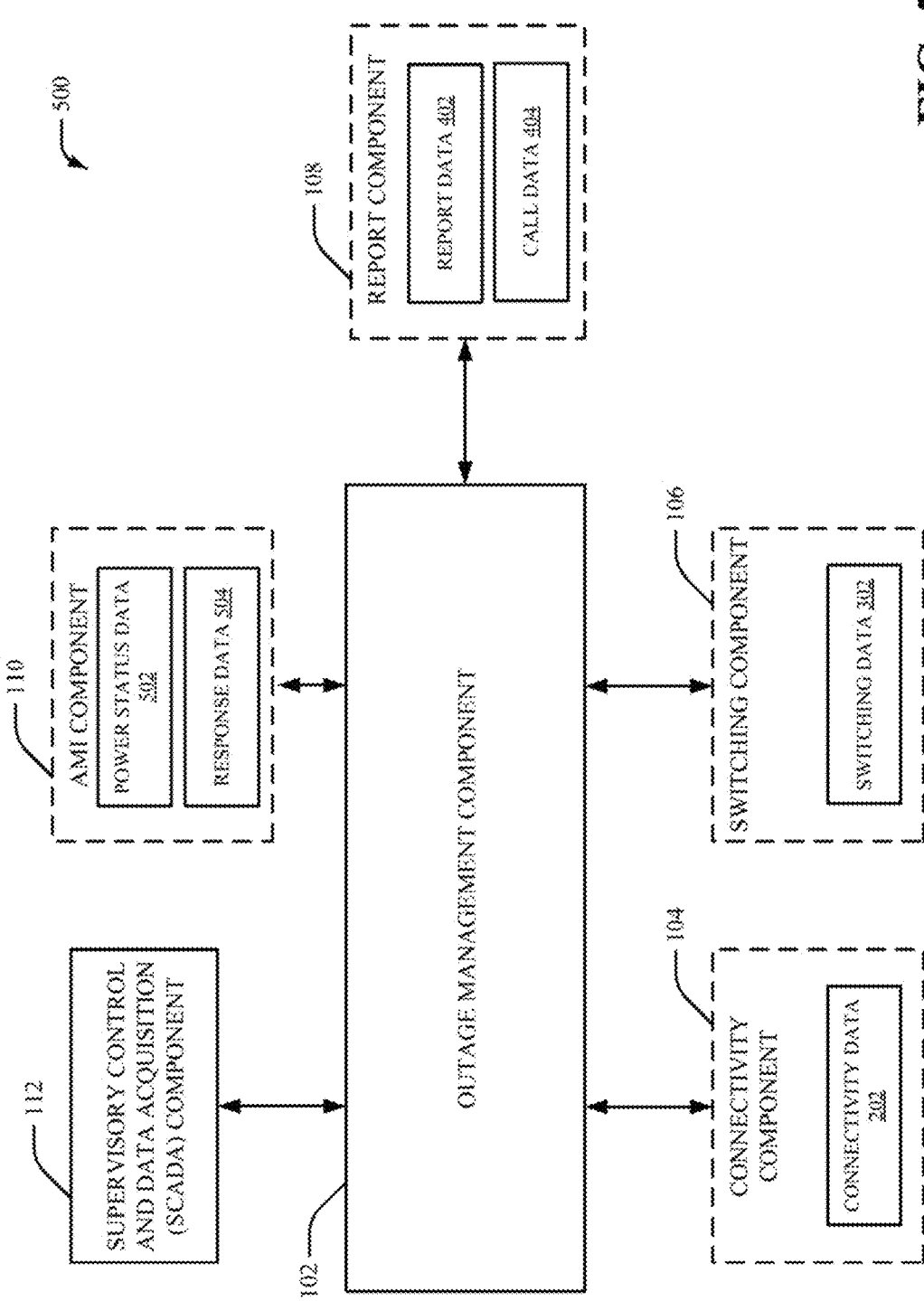

FIG. 5 is a diagram of an example system 500 in accordance with aspects of the subject disclosure. System 500 includes the outage management component 102. Additionally, the system 500 can include the connectivity component 104, the switching component 106, a report component 108, the AMI component 110 and/or the SCADA component 112. The AMI component 110 can generate power status data 502. Additionally or alternatively, the AMI component 110 can generate meter data 504. Furthermore, the AMI component 110 can provide (e.g., transmit) the power status data 502 and/or the meter data 504 to the outage management component 102. The power status data 502 can be data indicative of a power status for devices in the electrical energy distribution system. In one example, the AMI component 110 can "ping" devices in the electrical energy distribution system to determine whether the devices respond (e.g., the power status data 502 can be associated with "ping" responses from devices in the electrical energy distribution system). For example, the AMI component 110 can "ping" a device (e.g., a meter) in the electrical energy distribution system, and if the device does not respond, the AMI component 110 can determine that the device does not have power (e.g., the device is de-energized). The meter data 504 can be data indicative of meter readings associated with devices in the electrical energy distribution system. The meter data 504 can include data associated with triggered relays (e.g., relays triggered in response to a power outage in the electrical energy distribution system). The meter data 504 can also include alarm identification information associated with an alarm generated in response to a power outage in the electrical energy distribution system. In one example, the meter data 504 can include automatic meter readings provided by a set of meters in the electrical energy distribution system.

Figure 6:
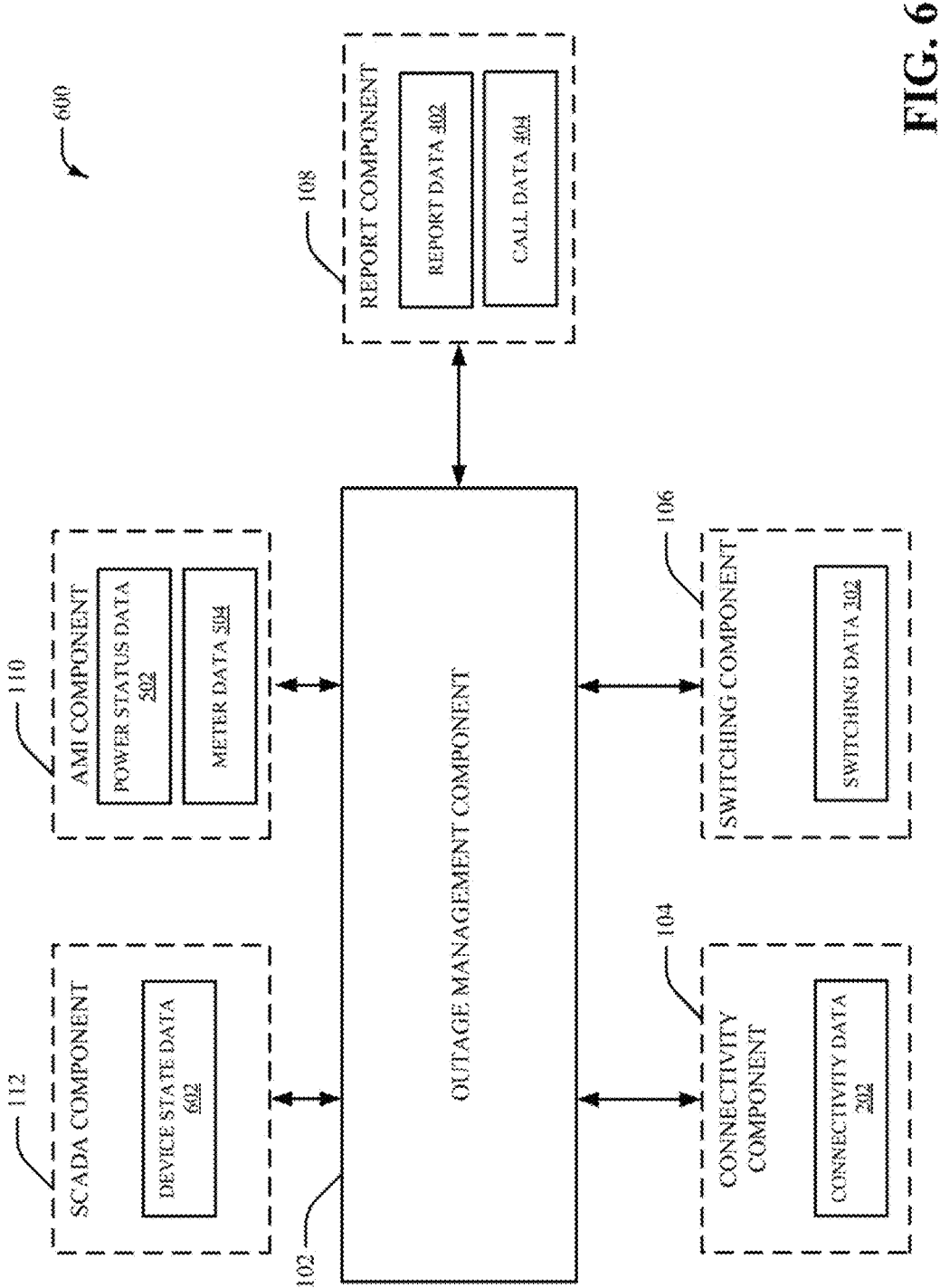

FIG. 6 is a diagram of an example system 600 in accordance with aspects of the subject disclosure. System 600 includes the outage management component 102. Additionally, the system 600 can include the connectivity component 104, the switching component 106, a report component 108, the AMI component 110 and/or the SCADA component 112. The SCADA component 112 can generate device state data 602. Furthermore, the SCADA component 112 can provide (e.g., transmit) the device state data 602 to the outage management component 102. The SCADA component 112 can manage events associated with the electrical energy distribution system. As such, the device state data 602 can be associated with determined events and/or tracked events in the electrical energy distribution system, abnormal conditions associated with the electrical energy distribution system, deviations from an operation plan or a normal state associated with the electrical energy distribution system (e.g., a state for the electrical energy distribution system without a power outage), etc.

In an aspect, the device state data 602 can be associated with a tag (e.g., an identifier) associated with a device and/or a status of a device in response to a power outage in the electrical energy distribution system. The SCADA component 112 can generate the device state data 602 by obtaining and/or analyzing measurement data for a device in the electrical energy distribution system, monitoring relay data associated with the electrical energy distribution system, monitoring oscillation data associated with the electrical energy distribution system, managing limits (e.g., set point limits) associated with the electrical energy distribution system, managing alarms and/or overloads associated with the electrical energy distribution system, tagging data for a device associated with the electrical energy distribution system, archiving data associated with a device in the electrical energy distribution system, managing faults associated with a device in the electrical energy distribution system, etc. In another aspect, the SCADA component 112 can include a tagging feature for identifying and/or tagging a device in the electrical energy distribution system. For example, the SCADA component 112 can generate tags for devices in the electrical energy distribution system to facilitate determining a state and/or an identity of devices in the electrical energy distribution system. As such, the device state data 602 can include tags for devices in the electrical energy distribution system. Additionally, the SCADA component 112 can generate the device state data 602 based on coded signals (e.g., encoded signals) that provide control of and/or information regarding a device in the electrical energy distribution system. In yet another aspect, the SCADA component 112 can capture measurement data associated with devices in electrical energy distribution system in response to a power outage in the electrical energy distribution system. For example, the SCADA component 112 can analyze measurement data to identify changes to the electrical energy distribution system in response to a power outage in the electrical energy distribution system. The SCADA component 112 can also determine whether a device in the electrical energy distribution system is provided a different amount of power and/or different operation limits in response to a power outage in the electrical energy distribution system. As such, the device state data 602 can be associated with measurement data that is captured, analyzed and/or determined by the SCADA component 112.

Figure 7:
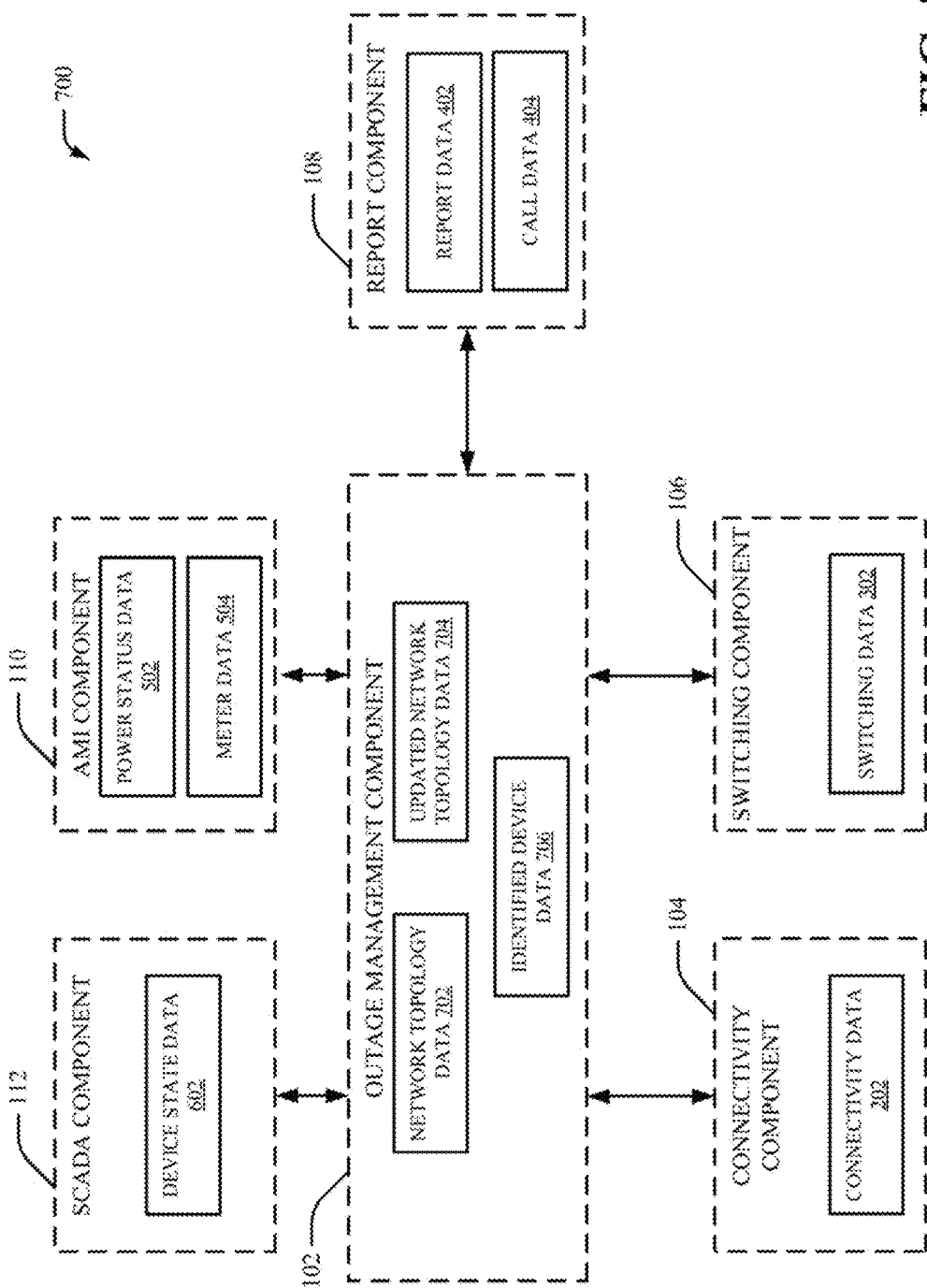

FIG. 7 is a diagram of an example system 700 in accordance with aspects of the subject disclosure. System 700 includes the outage management component 102. Additionally, the system 700 can include the connectivity component 104, the switching component 106, a report component 108, the AMI component 110 and/or the SCADA component 112. The outage management component 102 can generate network topology data 702. For example, the outage management component 102 can generate the network topology data 702 based on the connectivity data 202 and/or the switching data 302. The network topology data 702 can be indicative of a topology calculation for the electrical energy distribution system (e.g., when the electrical energy distribution system is associated with a power outage). In certain implementations, the network topology data 702 can also be generated based on the report data 402, the call data 404, the power status data 502, the meter data 504 and/or the device state data 602. Furthermore, the outage management component 102 can generate updated network topology data 704. For example, the outage management component 102 can generate the updated network topology data 704 based on the report data 402, the call data 404, the power status data 502, the meter data 504 and/or the device state data 602. The updated network topology data 704 can be indicative of an topology calculation and/or a new topology calculation for the electrical energy distribution system (e.g., when the electrical energy distribution system is associated with a power outage). The outage management component 102 can also generate identified device data 706. The identified device data 706 can be indicative of a device in the electrical energy distribution system that satisfies a criterion associated with a power outage in the electrical energy distribution system. For example, the identified device data 706 can be associated with a device that is a source for an outage (e.g., a power outage) associated with the electrical energy distribution system. The outage management component 102 can generate the identified device data 706 based on the updated network topology data 704.

Figure 8:
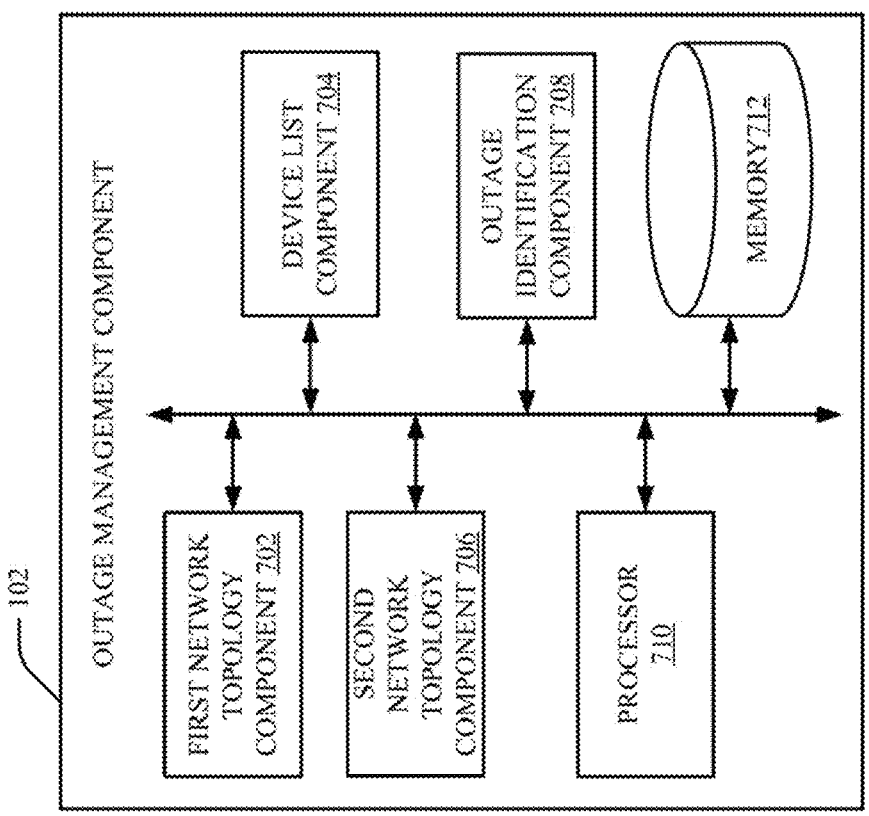
FIG. 8 is a high-level block diagram of an example outage management component in accordance with aspects of the subject disclosure.

FIG. 8 is a diagram of an example outage management component 102 in accordance with aspects of the subject disclosure. In FIG. 8, the outage management component 102 includes a first network topology component 802, a device list component 804, a second network topology component 806 and an outage identification component 808. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. System 800 can include memory 812 for storing computer executable components and instructions. System 800 can further include a processor 810 to facilitate operation of the instructions (e.g., computer executable components and instructions) by system 800.

The first network topology component 802 can generate the network topology data 702 based on the connectivity data 202 and/or the switching data 302. In certain implementations, the first network topology component 802 can also generate the network topology data 702 based on the report data 402, the call data 404, the power status data 502, the meter data 504 and/or the device state data 602. In an aspect, the network topology component 802 can generate the network topology data 702 based on coded feedback data provided by devices in the electrical energy distribution system. For example, the connectivity data 202 and/or the switching data 302 can be generated based on coded (e.g., encoded) feedback data received from devices in the electrical energy distribution system. In another aspect, the network topology component 802 can generate the network topology data 702 based on a location of the devices with respect to the electrical energy distribution system (e.g., with respect to other devices in the electrical energy distribution system). For example, the connectivity data 202 and/or the switching data 302 can be associated with location data indicative of a location for devices (e.g., devices in the electrical energy distribution system) associated with the connectivity data 202 and/or the switching data 302. In yet another aspect, the network topology component 802 can generate the network topology data 702 based on the power status data 502. For example, the power status data 502 can facilitate determination of the connectivity data 202 and/or the switching data 302.

The device list component 804 can determine, based on the network topology data 702, a first set of devices (e.g., a first subset of devices) from devices included in the electrical energy distribution system. The first set of devices determined by the device list component 804 can be de-energized (e.g., the first set of devices can be a set of de-energized devices). Additionally, the device list component 804 can determine a second set of devices (e.g., a second subset of devices) from the devices included in the electrical energy distribution system. The second set of devices can be a set of devices that are not included in the first set of devices. Moreover, the second set of devices can be a set of devices that are not confirmed by the first network topology component 802 to be de-energized (e.g., a device included in the second set of devices may be de-energized or energized). In an aspect, the device list component 804 can determine the first set of devices in response to a determination that the network topology data 702 satisfies a defined criterion. For example, the device list component 804 can determine the first set of devices in response to a determination that the network topology data 702 indicates that a power outage exists in the electrical energy distribution system.

The second network topology component 806 can generate the updated network topology data 704 based on the report data 402, the call data 404, the power status data 502, the meter data 504 and/or the device state data 602. For example, the second network topology component 806 can generate the updated network topology data 704 based on the meter data 504 indicative of meter readings associated with the second set of devices. In an aspect, the second network topology component 806 can generate the updated network topology data 704 by analyzing the second set of devices. For example, the second network topology component 806 can generate the updated network topology data 704 by analyzing a first device from the second set of devices based on a set of parameterized equations. The second network topology component 806 can select the set of parameterized equations for the first device based on a determined device type for the first device and/or the device state data 602 provided by the SCADA component 112. Furthermore, the second network topology component 806 can apply a weight to the set of parameterized equations for the first device based on a determined device type for the first device and/or the device state data 602 provided by the SCADA component 112. The set of parameterized equations for the first device can consider the report data 402, the call data 404, the power status data 502, the meter data 504 and/or the device state data 602 for the first device. For example, the set of parameterized equations for the first device can consider number of calls, percentage of calls and/or AMI reports for the first device. Furthermore, the set of parameterized equations for the first device can consider number of calls, percentage of calls and/or AMI reports for other devices that are predicted to be de-energized (e.g., downstream devices, with respect to the first device, that are predicted to be open, etc.). Moreover, the set of parameterized equations can employ parameters for a plurality of device types (e.g., a transformer fuse, a line fuse, a breaker, etc.). In a non-limiting example, the set of parameterized equations can be a set of five parameterized equations. However, it is to be appreciated that the set of parameterized equations can include a different number of parameterized equations.

In another aspect, the second network topology component 806 can remove a second device from the second set of devices based on a location of the second device in the electrical energy distribution system with respect to the first device. For example, in response to a determination that the first device is an upstream device in the electrical energy distribution system, a second device that is downstream from the first device can be removed from the second set of devices. As such, a set of parameterized equations can be employed for every device in the second set of device, and predictions (e.g., a prediction for a source of a power outage) for devices that are downstream from an upstream predicted device can be cancelled.

The outage identification component 808 can generate the identified device data 706 based on the updated network topology data 704. For example, the outage identification component 808 can identify, based on the updated network topology data 704, a device from the second set of devices in the electrical energy distribution system that satisfies a criterion associated with the power outage. The device associated with the identified device data 706 can be a source for an outage (e.g., a power outage) associated with the electrical energy distribution system. In another example, the outage identification component 808 can identify, based on the updated network topology data 704, a subset of devices from the second set of devices in the electrical energy distribution system that satisfies or potentially satisfies a criterion associated with the power outage. For example, the subset of devices can include devices that are potentially a source for an outage (e.g., a power outage) associated with the electrical energy distribution system. In an embodiment, the outage identification component 808 can present the identified device data 706 on a display of a computing device. For example, the outage identification component 808 can present textual information describing the device from the second set of devices in the electrical energy distribution system that satisfies the criterion associated with the power outage. In another example, the outage identification component 808 can identify the device (e.g., the device from the second set of devices in the electrical energy distribution system that satisfies the criterion associated with the power outage) on a map that presents on the second set of devices in the electrical energy distribution system on a display of a computing device. For example, the outage identification component 808 can highlight (e.g., mark, emphasize, etc.) the device on a map presented on a display of a computing device. In an embodiment, the outage identification component 808 can present the subset of devices from the second set of devices on a display of a computing device. Therefore, a user can identify a source for a power outage in the electrical energy distribution system from the subset of devices provided by the outage identification component 808.

While FIGS. 1-8 depict separate components in system 100, 200, 300, 400, 500, 600, 700 and 800, it is to be appreciated that the components may be implemented in a common component. Further, it can be appreciated that the design of system 100, 200, 300, 400, 500, 600, 700 and/or 800 can include other component selections, component placements, etc., to facilitate managing, identifying and/or predicting outages associated with an electrical energy distribution system (e.g., a power grid system).

Figure 9:
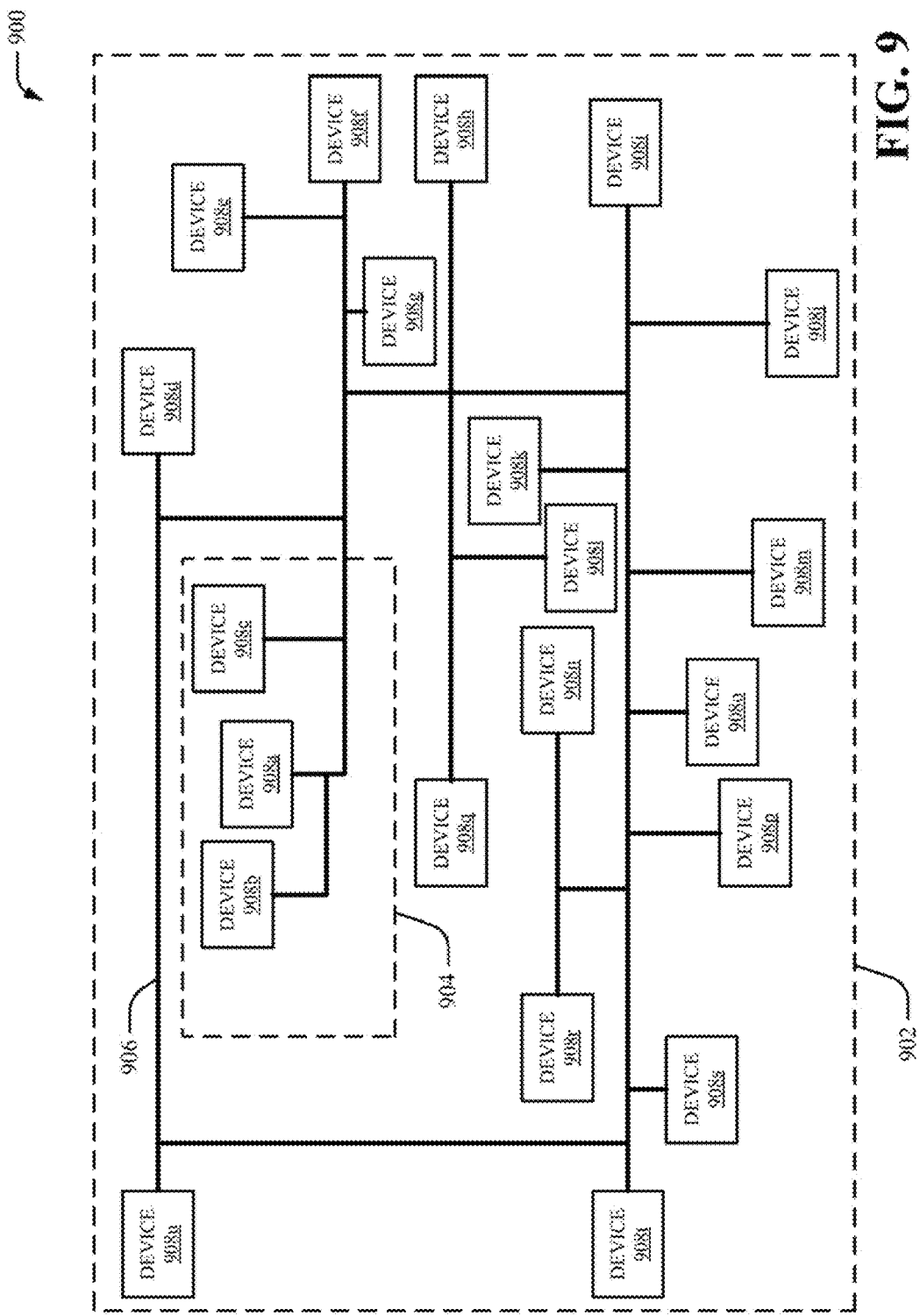
FIG. 9 illustrates an example electrical energy distribution system in accordance with aspects of the subject disclosure.

FIG. 9 illustrates an electrical energy distribution system 900 in accordance with aspects of the subject disclosure. The electrical energy distribution system 900 includes a first electrical energy distribution portion 902 and a second electrical energy distribution portion 904. The first electrical energy distribution portion 902 can be associated with the network topology data 702. Furthermore, the first electrical energy distribution portion 902 can include a network of transmission lines 906. The network of transmission lines 906 can be coupled to devices in the electrical energy distribution. For example, the network of transmission lines 906 can be coupled to a first set of devices that includes devices 908a-u. It is to be appreciated that electrical energy distribution system 900 is merely an example. Therefore, an electrical energy distribution system can include a greater number of devices or a lower number of devices. In an aspect, the first electrical energy distribution portion 902 (e.g., the first set of devices that includes devices 908a-u) can be determined based on the connectivity data 202 and/or the switching data 302. In certain implementations, the first electrical energy distribution portion 902 (e.g., the first set of devices that includes devices 908a-u) can additionally be determined based on the report data 402, the call data 404, the power status data 502, the meter data 504 and/or the device state data 602. The device 908a can be a device that satisfies a criterion associated with a power outage in the electrical energy distribution system 900. For example, the device 908a can be a source for an a power outage associated with the electrical energy distribution system 900. Furthermore, the device 908a can be associated with the identified device data 706. The second electrical energy distribution portion 904 can be associated with the updated network topology data 704. The second electrical energy distribution portion 904 can be associated with a subset of the devices first set of devices that includes devices 908a-u. For example, the second electrical energy distribution portion 904 can be associated with the devices 908a-c. In an aspect, the second electrical energy distribution portion 904 (e.g., the second set of devices that includes devices 908a-c) can be determined based on the report data 402, the call data 404, the power status data 502, the meter data 504 and/or the device state data 602.

Figure 10:
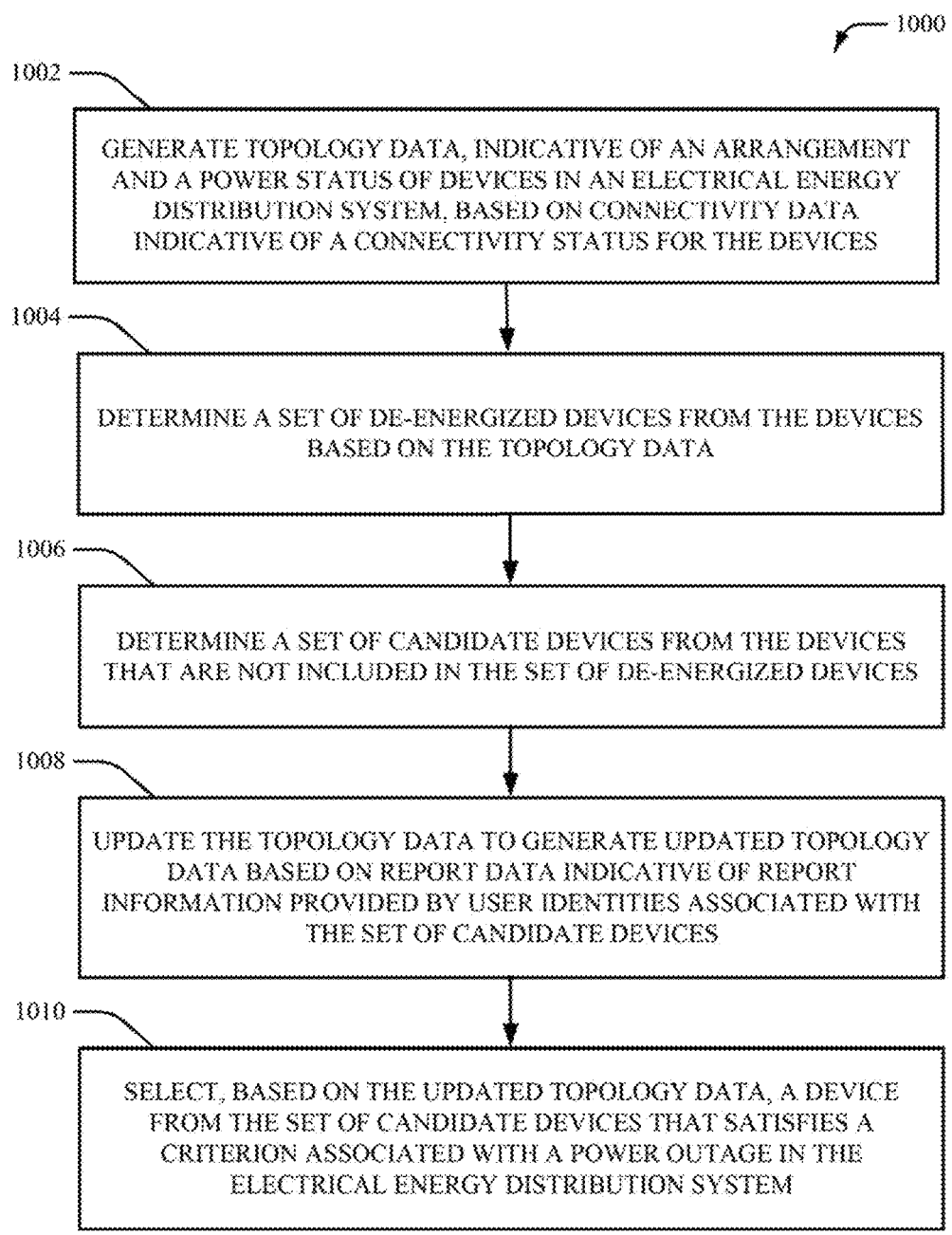
FIG. 10 illustrates a method for managing, predicting and/or identifying a power outage associated with an electrical energy distribution system in accordance with aspects of the subject disclosure.

In view of the example system(s) described above, example method(s) that can be implemented in accordance with the disclosed subject matter can be better appreciated with reference to flowcharts in FIG. 10. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 10 illustrates a methodology 1000 for managing, identify and/or predicting outages associated with an electrical energy distribution system, according to an aspect of the subject innovation. At 1002, topology data, indicative of an arrangement and a power status of devices in an electrical energy distribution system, is generated based on connectivity data indicative of a connectivity status for the devices. Additionally or alternatively, the topology data can be generated based on switching data indicative information for switching operations associated with the devices (e.g., a status for the switching operations, etc.). In certain implementations, the topology data can also be generated based on power data indicative of a power state of the devices, device state data indicative of a state of the devices, meter data indicative of meter readings associated with the devices, report data indicative of a report generated for the electrical energy distribution system and/or call data indicative of information provided by user identities via phone calls. In an aspect, the topology data can be generated based on encoded data (e.g., encoded feedback data) provided by the devices. In another aspect, the topology data can be generated based on a location of the devices with respect to other devices in the electrical energy distribution system.

At 1004, a set of de-energized devices from the devices is determined based on the topology data. The set of de-energized devices can be determined to be de-energized based on the topology data. At 1006, a set of candidate devices from the devices that are not included in the set of de-energized devices is determined. The set of candidate devices can be a set of devices that are not confirmed to be de-energized (e.g., a device included in the set of candidate devices may be de-energized or energized). Furthermore, each candidate device in the set of candidate devices can potentially be a source for a power outage associated with the electrical energy distribution system.

At 1008, the topology data is updated to generate updated topology data based on report data indicative of report information provided by user identities associated with the set of candidate devices. For example, the topology data can be updated based on call data indicative of information provided by the user identifies via phone calls. Additionally or alternatively, the topology data can be updated based on meter data indicative of meter readings associated with the set of candidate devices, power data indicative of a power state of the set of candidate devices and/or device state data indicative of a state of the set of candidate devices. In one example, the topology data can be updated by analyzing the set of candidate devices based on a number of phone calls and/or a percentage of phone calls received from user identities associated with the set of candidate devices. In an aspect, the topology data can be updated by removing a device from the set of candidate devices based on a location of the device in the electrical energy distribution system (e.g., a location of the device with respect to other devices in the electrical energy distribution system).

At 1010, a device from the set of candidate devices that satisfies a criterion associated with a power outage in the electrical energy distribution system is selected based on the updated topology data. For example, the device selected from the set of candidate device can be a source for a power outage in the electrical energy distribution system is selected based on the updated topology data. In an aspect, data associated with the device selected from the set of candidate devices can be presented on a display of an electronic device. For example, textual data associated with the device selected from the set of candidate devices can be presented on a display of an electronic device. In another example, a map displayed on a display of an electronic device can be marked (e.g., highlighted) to identify the device selected from the set of candidate devices.

Figure 11:
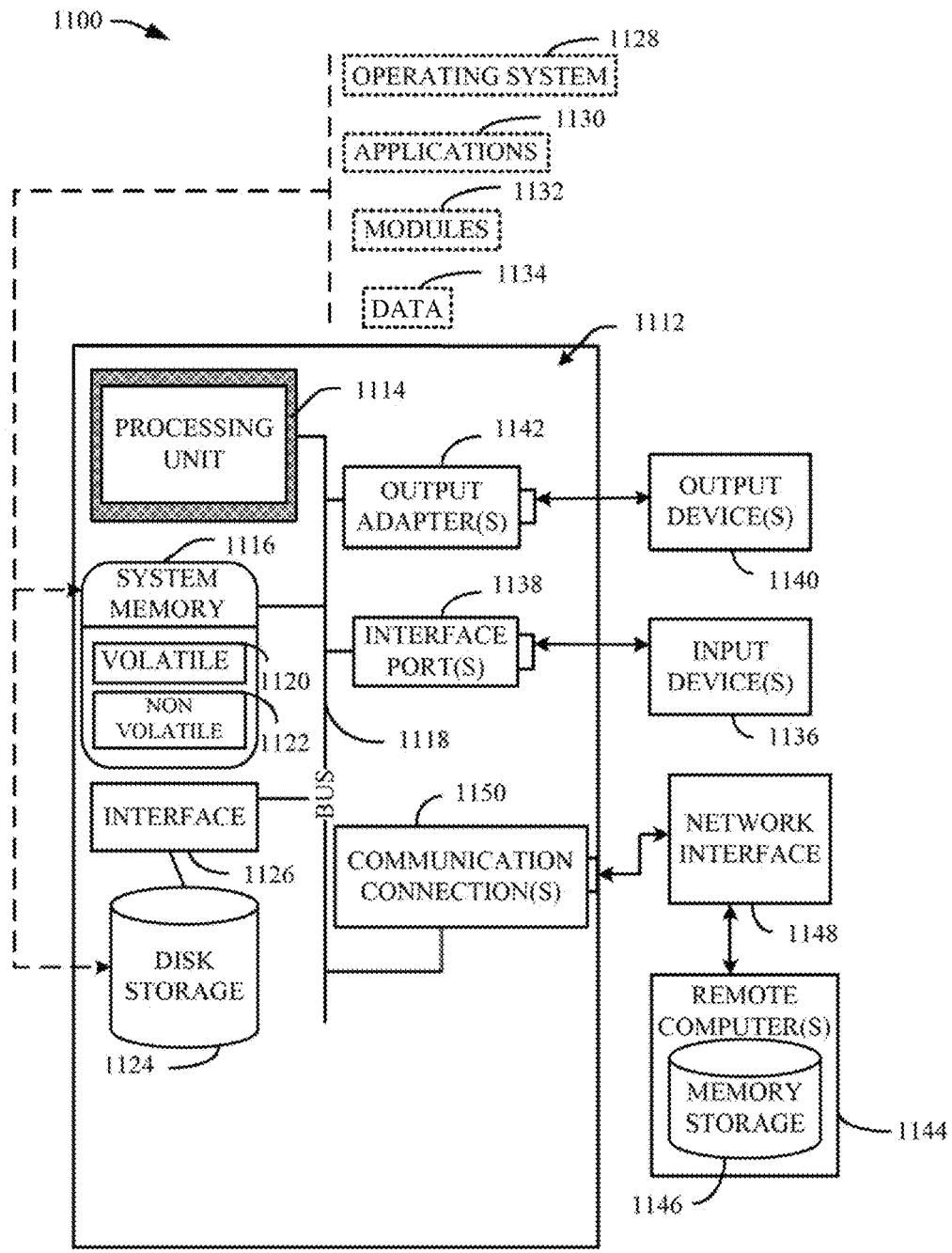
FIG. 11 is a schematic block diagram illustrating a suitable operating environment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112 includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1116 can include volatile memory 1120 and nonvolatile memory 1122. A basic input/output system, containing routines to transfer information between elements within computer 1112, such as during start-up, can be stored in nonvolatile memory 1122. By way of illustration, and not limitation, nonvolatile memory 1122 can include read only memory, programmable read only memory, electrically programmable read only memory, electrically erasable read only memory, or flash memory. Volatile memory 1120 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, a user interface can be embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus, an infrared port, a Bluetooth port, an IP port, or a logical port associated with a wireless service, etc. Output device(s) 1140 use some of the same type of ports as input device(s) 1136.

Thus, for example, a universal serial busport can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and digital subscriber line modems, integrated services digital network adapters, and Ethernet cards.

Figure 12:
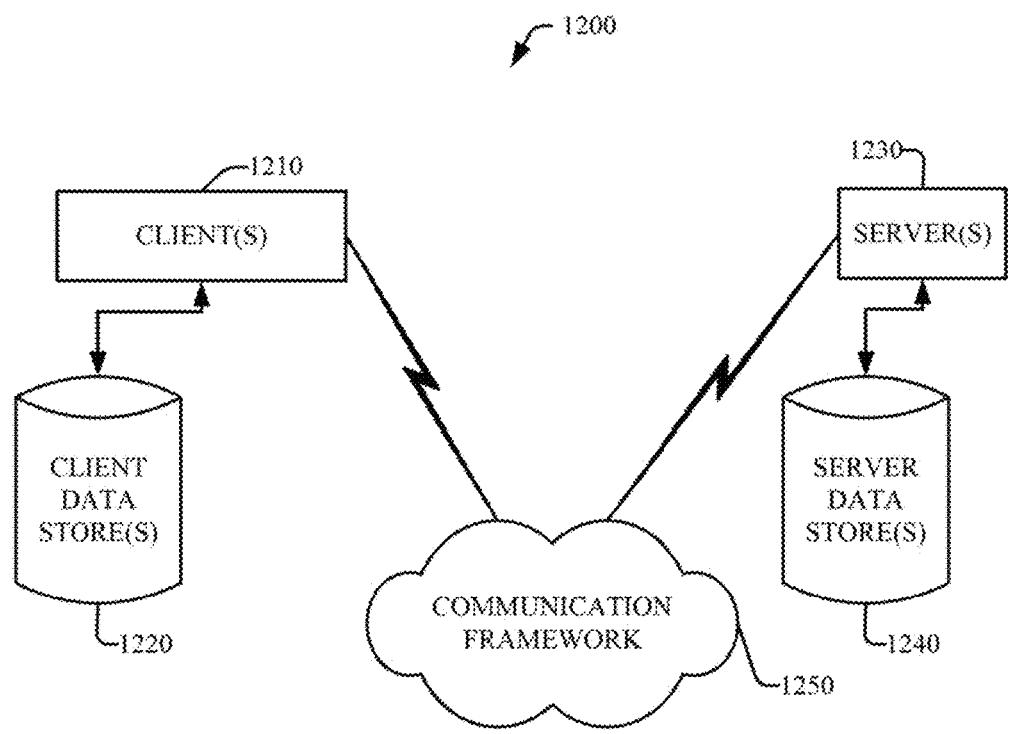
FIG. 12 is a schematic block diagram of a sample-computing environment.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server (s) 1230 are operatively connected to one or more server data store(s) 1240 that can be employed to store information local to the servers 1230.

Figure 13:
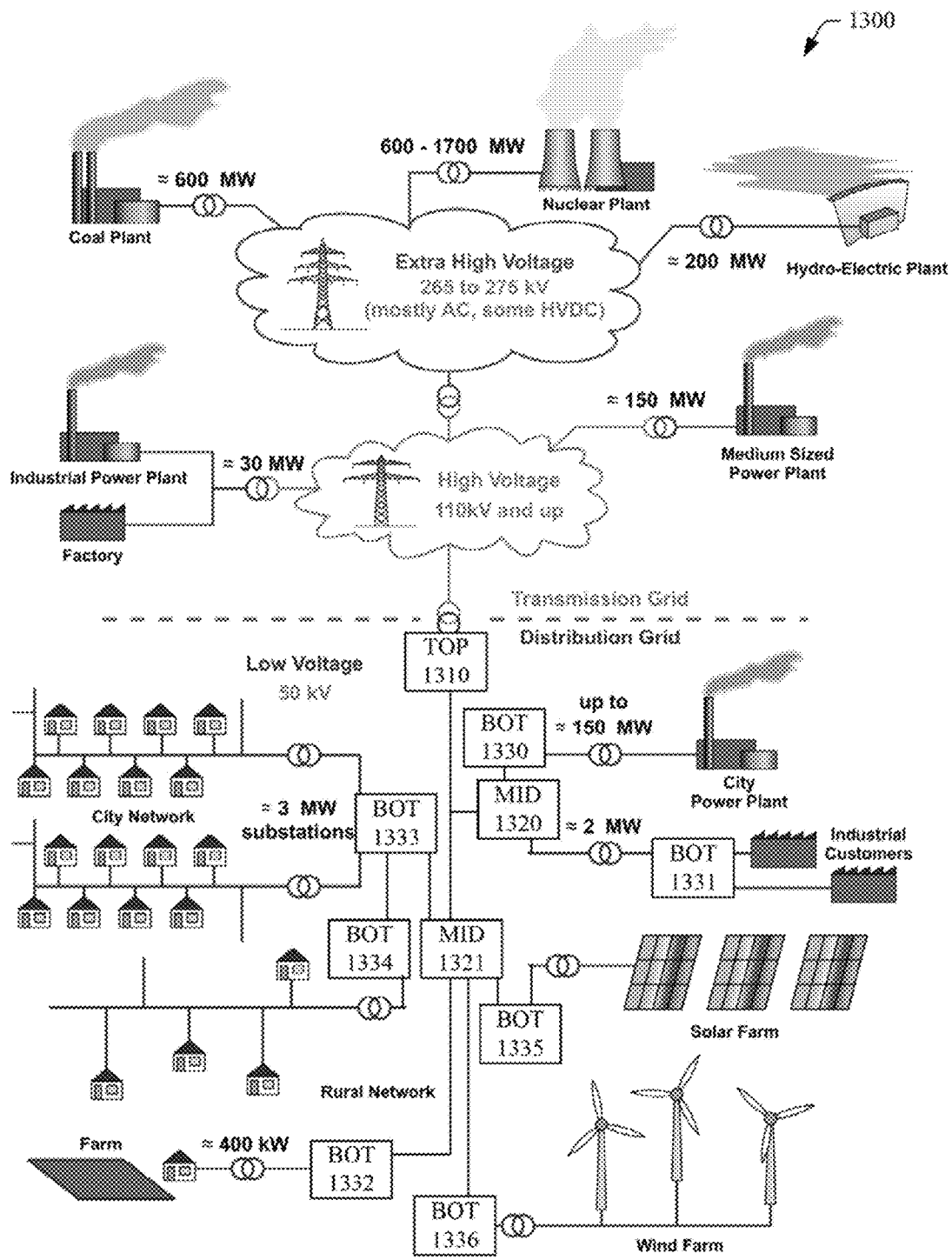
FIG. 13 depicts a diagram of an example electrical grid environment in which the various aspects of the disclosed subject matter can be practiced.

FIG. 13 depicts a diagram of an example electrical grid environment 1300 in which the various aspects of the disclosed subject matter can be practiced. It is to be appreciated that this figure and the associated disclosure is presented as a non-limiting example to facilitate a general comprehension of one or more aspects of the disclosed subject matter in connection with hypothetical electrical grid assets. Further, while sample values and assets are illustrated for context, these same sample values and assets are non-limiting and should not be viewed as defining any narrowing of scope. Generally, the assets of FIG. 13 can be assigned to a transmission grid portion (upper portion of figure) or a distribution grid portion (lower portion of figure) as is typical in many electrical power grids worldwide. Transmission systems often are associated with very high AC voltages or even DC transmission of power. Transmission systems are generally presented in the context of delivering high power to regional distribution networks managed by a distribution grid entity.

The conventional electrical distribution grid, as disclosed herein, generally has a flat control structure with control being centralized in a distribution control center (DCC). In contrast, as illustrated in FIG. 13, a non-flat control topography can be employed in accord with the subject matter disclosed herein. In this non-limiting example, three tiers of electrical distribution control system components are illustrated. A top-level (e.g., upper level) control node 1310 (also referred to as TOP 1310) (e.g., comprising a top-level DNNC component and top-level PSBC) can be communicatively coupled to junior level control nodes (e.g., 1320 to 1336), which can comprise junior level DNNC components and junior level PSBCs. In FIG. 13, the interconnections illustrate a basic tree structure topology.

In an aspect, two mid-level control nodes 1320 (also referred to as MID 1320) and 1321 (also referred to as MID 1321) can be logically placed between the bottom-level (e.g., lower level) control node and the top-level control node 1310. Further, the several bottom-level control nodes, such as bottom-level control nodes 1330 through 1336 (also referred to as BOT 1330 through BOT 1336), can be associated with various edge assets. For example, bottom-level control node 1330 can be associated with a city power plant and bottom-level control node 1331 can be associated with a small group of industrial customers. Bottom-level control node 1330 and 1331 can be logically connected to top-level control node 1310 by way of mid-level control node 1320. As such, data and rules can be bubbled up (e.g., communicated upward in the hierarchy) or pushed down (e.g., communicated downward in the hierarchy) by way of this communication path. The bidirectional communication and closed loop control at each level (e.g., top, mid, and bottom) can facilitate improved electrical distribution grid performance. For example, where additional power is needed by the industrial customers associated with bottom-level control node 1331, control signals from mid-level control node 1320 can source more power from city power plant by way of bottom-level control node 1330 without directly involving the top-level control node 1310 or draining energy from the illustrated solar farm or wind farm.

Similarly, mid-level control node 1321 can be associated with bottom-level control node 1332 through 1336. Bottom-level control node 1333, for example, can be logically associated with a plurality of transformers service a portion of a city network. Further, for example, bottom-level control node 1334 can be associated with a single transformer as part of a rural network. Moreover, at bottom-level control node 1332, for example, the control node can be associated with a single consumer, such as the farm. The control nodes also can be associated with distributed power generation, for example bottom-level control node 1335 associated with a solar farm and bottom-level control node 1336 associated with a wind farm. As such, bidirectional communication between top-level control node 1310 and bottom-level control node 1332 through 1336 can be by way of mid-level control node 1321. As such, rules propagated for mid-level control node 1320 and associate child control nodes can be different from rules propagated for mid-level control node 1321 and associated child control nodes. Further, independent closed loop control can be affected, for example, at bottom-level control node 1334 and the associated rural customers without impacting bottom-level control node 1333 and the associated city network.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "operator," "switchman," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a memory to store executable instructions; and
    a processor coupled to the memory, that executes or facilitates execution of the executable instructions to perform operations, comprising:
        generating network topology data, indicative of a topology for an electrical energy distribution system associated with a power outage, based on connectivity data indicative of a connectivity status for devices in the electrical energy distribution system;
        determining, based on the network topology data, a first set of devices from the devices that are de-energized;
        determining a second set of devices from the devices that are not included in the first set of devices, wherein the second set of devices is indicative of a set of candidate devices for the power outage that is not confirmed to be de-energized;
        updating, based on meter data indicative of meter readings provided by a set of relay devices associated with the second set of devices indicative of the set of candidate devices for the power outage, the network topology data to generate updated network topology data; and
        identifying, based on the updated network topology data, a device from the second set of devices that satisfies a criterion associated with the power outage.

2. The system of claim 1, wherein the generating the network topology data comprises generating the network topology data based on switching data indicative of a status for switching operations associated with the devices in the electrical energy distribution system.

3. The system of claim 1, wherein the generating the network topology data comprises generating the network topology data based on coded feedback data provided by the devices in the electrical energy distribution system.

4. The system of claim 1, wherein the generating the network topology data comprises generating the network topology data based on a location of the devices with respect to the electrical energy distribution system.

5. The system of claim 1, wherein the generating the network topology data comprises generating the network topology data based on power data indicative of a power status for the devices in the electrical energy distribution system.

6. The system of claim 1, wherein the determining the first set of devices comprises determining the first set of devices in response to a determination that the network topology data satisfies a defined criterion.

7. The system of claim 1, wherein the updating comprises updating the network topology data based on report data indicative of report information provided by user identities associated with the second set of devices.

8. The system of claim 1, wherein the updating comprises analyzing a first device from the second set of devices based on a set of parameterized equations.

9. The system of claim 8, wherein the analyzing the first device comprises selecting the set of parameterized equations based on a determined device type for the first device.

10. The system of claim 8, wherein the updating comprises removing a second device from the second set of devices based on a location of the second device in the electrical energy distribution system with respect to the first device.

11. A method, comprising:
    generating, by a system comprising a processor, topology data, indicative of an arrangement and a power status of devices in an electrical energy distribution system, based on connectivity data indicative of a connectivity status for the devices;
    determining, by the system, a set of de-energized devices from the devices based on the topology data;
    determining, by the system, a set of candidate devices from the devices that are not included in the set of de-energized devices, wherein the set of candidate devices is indicative of one or more candidates for a power outage in the electrical energy distribution system;
    updating, by the system, the topology data to generate updated topology data based on meter data indicative of meter readings provided by a set of relay switches associated with the set of candidate devices that is indicative of the one or more candidates for the power outage; and
    selecting, by the system and based on the updated topology data, a device from the set of candidate devices that satisfies a criterion associated with the power outage.

12. The method of claim 11, wherein the generating the topology data comprises generating the topology data based on switching data indicative information for switching operations associated with the devices.

13. The method of claim 11, wherein the generating the topology data comprises generating the topology data based on encoded data provided by the devices.

14. The method of claim 11, wherein the generating the topology data comprises generating the topology data based on a location of the devices with respect to other devices in the electrical energy distribution system.

15. The method of claim 11, wherein the updating comprises updating the topology data based on report data indicative of report information provided by user identities associated with the set of candidate devices.

16. The method of claim 15, wherein the updating comprises analyzing the set of candidate devices based on a number of phone calls received from the user identities associated with the set of candidate devices.

17. The method of claim 11, wherein the updating comprises removing a device from the set of candidate devices based on a location of the device in the electrical energy distribution system.

18. A computer readable storage device comprising executable instructions that, in response to execution, cause a device comprising a processor to perform operations, comprising:

generating network topology data, indicative of a topology calculation for a power grid system associated with a power outage, based on switching data indicative of a status for switching operations associated with devices in the power grid system;

determining, based on the network topology data, a first group of devices from the devices that are de-energized;

determining a second group of devices from the devices that are not included in the first group of devices, wherein the second group of devices is indicative of a group of candidate devices for the power outage that is not confirmed to be de-energized;

updating, based on monitoring data indicative of monitoring information from meter readings provided by a group of relay devices associated with the second group of devices indicative of the group of candidate devices for the power outage, the network topology data to generate updated network topology data; and identifying, based on the updated network topology data, a device from the second group of devices in the electrical energy distribution system that is a source for the power outage.

19. The computer readable storage device of claim 18, wherein the generating the network topology data comprises generating the network topology data based on connectivity data indicative of a connectivity status for the devices in the power grid system.

20. The computer readable storage device of claim 18, wherein the updating comprises updating the network topology data based on call data indicative of phone call feedback provided by user identities associated with the second group of devices.

* * * * *